(12) United States Patent
Robitaille

(10) Patent No.: US 8,346,035 B2
(45) Date of Patent: Jan. 1, 2013

(54) TWO STAGE INTEGRATOR ASSEMBLY

(75) Inventor: Blaise R. J. Robitaille, Barrie (CA)

(73) Assignee: Raytheon Canada Limited, Ottawa, ON (CA)

( * ) Notice: Subject to any disclaimer, the term of this patent is extended or adjusted under 35 U.S.C. 154(b) by 287 days.

(21) Appl. No.: 12/908,510

(22) Filed: Oct. 20, 2010

(65) Prior Publication Data

US 2012/0099324 A1    Apr. 26, 2012

(51) Int. Cl.
*G02B 6/24* (2006.01)
*G01F 23/00* (2006.01)
*H01J 5/20* (2006.01)

(52) U.S. Cl. .......... 385/27; 362/551; 362/580; 362/581; 29/428; 250/358.1; 250/338.4

(58) Field of Classification Search ............... 362/551, 362/580, 581, 29; 250/358.1, 338.4, 559.01; 385/27, 39; 29/428
See application file for complete search history.

(56) References Cited

U.S. PATENT DOCUMENTS

| | | | | |
|---|---|---|---|---|
| 4,325,607 | A * | 4/1982 | Carlsen | 385/70 |
| 4,389,567 | A * | 6/1983 | Khoe et al. | 250/214 LA |
| 7,402,792 | B2 * | 7/2008 | Michiyama et al. | 250/231.13 |
| 8,231,281 | B2 * | 7/2012 | Shacklette et al. | 385/60 |
| 2007/0018071 | A1 * | 1/2007 | Kruijswijk et al. | 250/205 |
| 2011/0048942 | A1 * | 3/2011 | Talutis | 204/409 |

* cited by examiner

*Primary Examiner* — Ali Alavi
(74) *Attorney, Agent, or Firm* — Daly, Crowley, Mofford & Durkee, LLP

(57) ABSTRACT

A modular radiation integrator assembly including a radiation source that emits radiation, a first integrator module including a first input port and a first output port, an adjust tube configured to partially receive the first integrator module and engage the radiation source in a manner such that the radiation emitted by the radiation source travels to and enters the first input port, and a second integrator module including a second input port and second output port, the second integrator module couplable to the first integrator module outside the adjust tube in a manner such that the radiation exits the first output port and enters the second input port.

31 Claims, 8 Drawing Sheets

TWO STAGE INTEGRATOR ASSEMBLY

FIELD OF THE INVENTION

This invention relates in general to optical systems and, more particularly, to techniques for integrating polychromatic radiation.

BACKGROUND

Due to advances in light emitting diode (LED) technology, LED's are becoming progressively more widely used in many fields. For example, there are image projection systems in which multi-color light from one or more LEDs is integrated, directed onto a digital micro-mirror device (DMD), and then routed to and displayed on a screen. Although existing LED integrators have been generally adequate for their intended purposes, they have not been entirely satisfactory in all respects. For example, existing LED integrators tend to be bulky rather than compact, difficult and expensive to manufacture, do not permit easy and rapid interchange of integrator light pipes, do not permit easy and rapid alignment of multiple integrator light pipes, do not permit easy and rapid replacement of a failed LED, and often require realignment after LED replacement.

BRIEF DESCRIPTION OF THE DRAWINGS

A better understanding of the present invention will be realized from the detailed description that follows, taken in conjunction with the accompanying drawings, in which:

FIG. 8 is a diagrammatic top view of a portion of the radiation integrator assembly 10 of FIG. 1.

DETAILED DESCRIPTION

Figure 1:
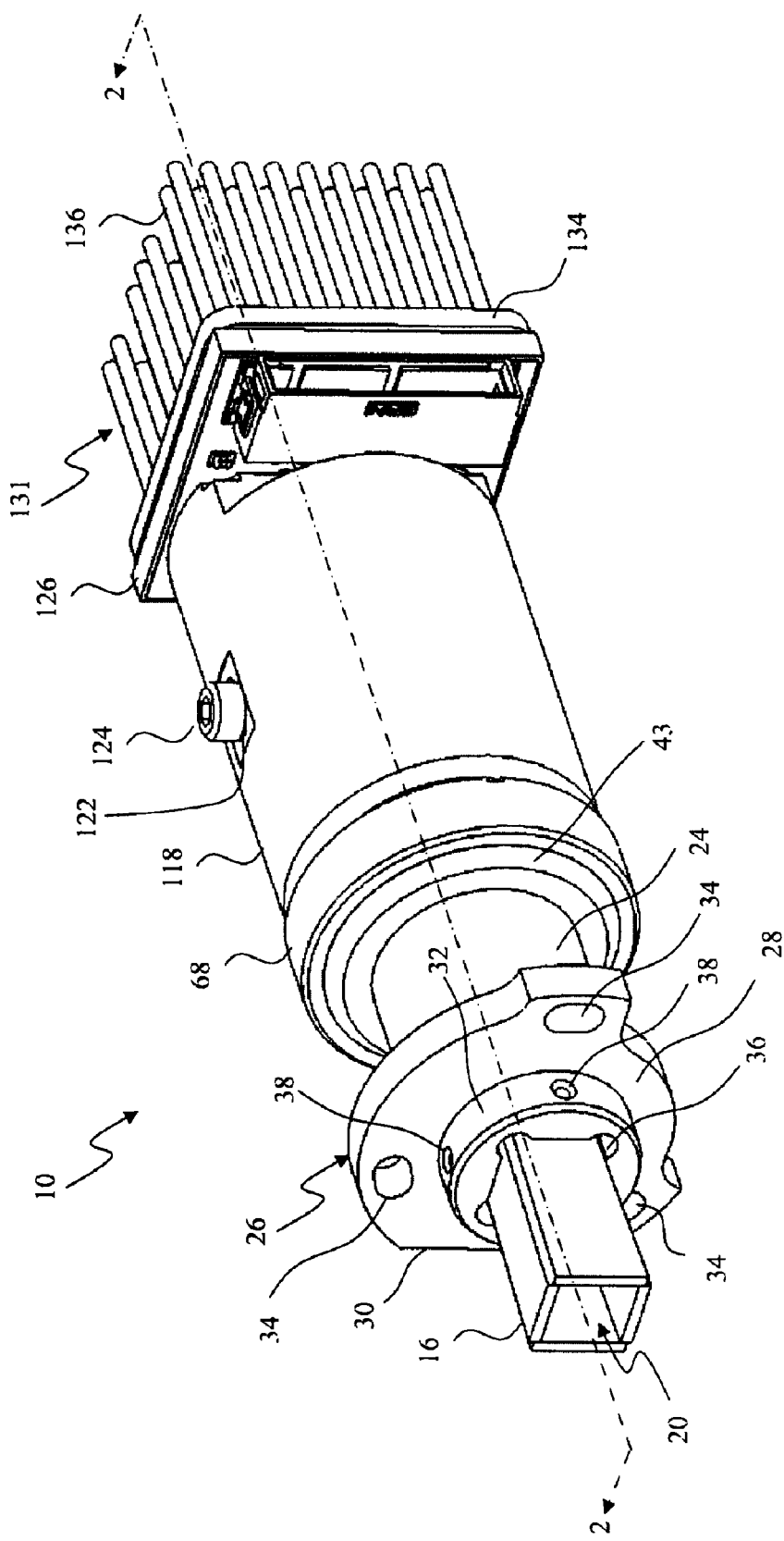
FIG. 1 is a diagrammatic perspective view of an apparatus that is a modular polychromatic radiation integrator assembly embodying aspects of the invention.
Figure 2:
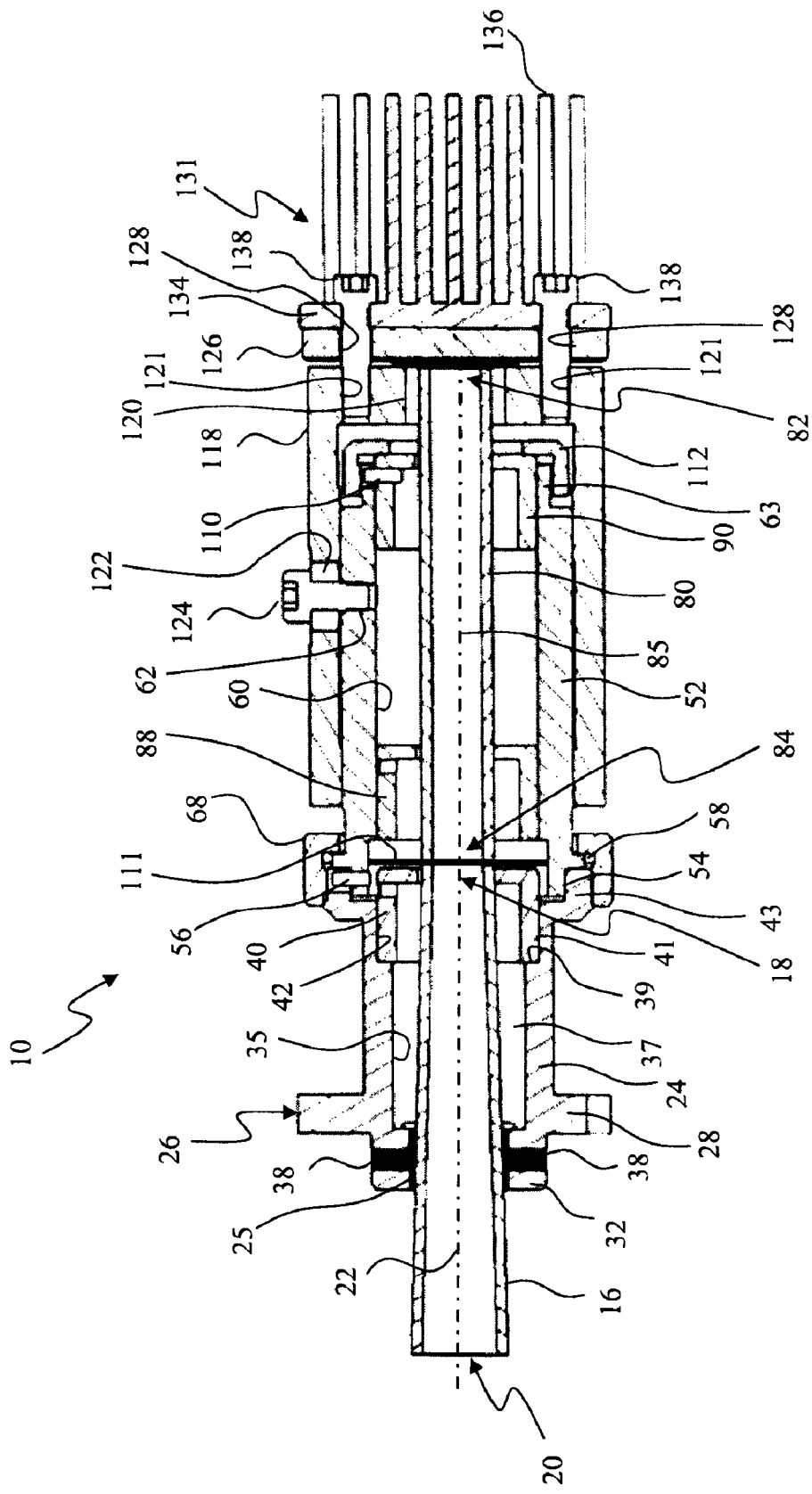
FIG. 2 is a diagrammatic sectional side view taken along line 2-2 in FIG. 1.

FIG. 1 is a diagrammatic perspective view of an apparatus that is a modular polychromatic radiation integrator assembly 10 embodying aspects of the invention. FIG. 2 is a diagrammatic sectional side view taken along line 2-2 in FIG. 1.

With reference to FIGS. 1 and 2, the assembly 10 includes a radiation guide or light pipe 16. The light pipe 16 includes four interior walls defining a passage that has a rectangular cross-sectional shape. An input port 18 and an output port 20 are respectively disposed at either end of the passage. Both input port 18 and output port 20 have a rectangular cross-sectional shape, however output port 20 is greater in size than input port 18. In other words, the passage in light pipe 16 has a cross-sectional size that tapers progressively from the output port 20 to the input port 18. Further, light pipe 16 includes an optical axis 22 extending longitudinally through the passage.

In the disclosed embodiment, the walls of the passage in light pipe 16 are made of a material that is commonly known as float glass. However, they could alternatively be made of any other suitable material. The inner side of each of these walls has a reflective coating of a known type that is not separately illustrated in the drawings, and that is highly reflective to all radiation within the visible spectrum. The various walls of float glass in the light pipe 16 are fixedly secured to each other by a suitable adhesive. In the disclosed embodiment, the adhesive is Norland Optical Adhesive 61 ("NOA 61"), which is available commercially from Norland Products of Cranbury, N.J. However, the adhesive could alternatively be any other suitable adhesive. U.S. patent application Ser. No. 12/823,725, entitled "Method and Apparatus for Generating Monochromatic or Polychromatic Radiation," discloses further aspects of radiation integration construction and materials and is hereby incorporated by reference in its entirety.

Figure 3:
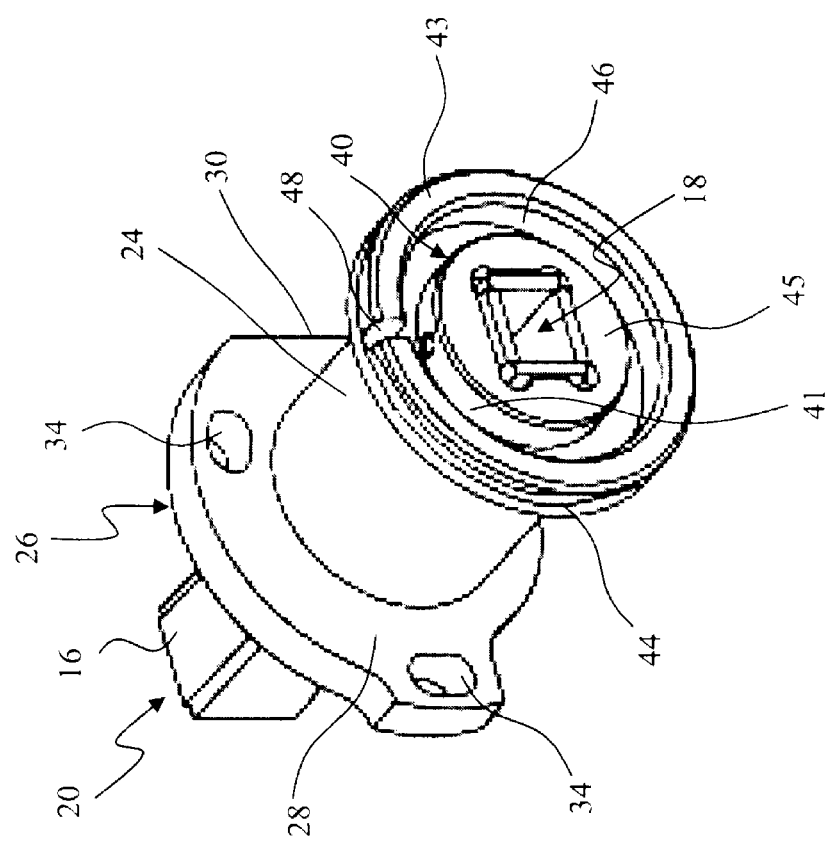
FIG. 3 is a diagrammatic perspective view of a tubular interface housing that is a component of the assembly 10 of FIG. 1.

FIG. 3 is a diagrammatic perspective view of a tubular interface housing 24 that is a component of the assembly 10 of FIG. 1. In the disclosed embodiment, the interface housing 24 is made of commercially-available aluminum alloy 6061-T6, but could alternatively be made of any other suitable material.

With reference to FIGS. 1, 2, and 3, the interface housing 24 includes a mounting part 26. The mounting part 26 includes an approximately circular plate or disk 28 having a flat 30 on one side thereof. The disk 28 can also be considered to be an annular flange. A cylindrical projection 32 extends axially-outwardly beyond the disk 28. The cylindrical projection 32 is approximately concentric about axis 22 with and of smaller diameter than the disk 28. The disk 28 also has three arcuate slots 34 that open axially therethrough, that each extend approximately circumferentially, and that are angularly spaced about axis 22 with respect to each other.

The mounting part 26 includes a rectangular aperture 36 that extends axially along axis 22 through the disk 28 and the projection 32. The light pipe 16 extends through the rectangular aperture 36 and along an internal passage 37 defined by an internal wall 35 of the interface housing 24. The dimensions of the aperture 36 are somewhat larger than the dimensions of the light pipe 16, to allow positioning therein. Further, the aperture 36 has circular cut-outs in each of its four corners, to further assist in positioning. Four angularly-spaced injection ports 38, extend radially through the projection 32 to the aperture 36. Adhesive is disposed within the injection ports 38 to securely bond the light pipe 16 within the interface housing 24. In the disclosed embodiment, the adhesive is a two-part epoxy adhesive, and in particular is ECCO-BOND® 45 SC mixed at a ratio of 1:1 with a catalyst that is ECOB #15 SC, both of which are available commercially from Emerson & Cuming of Billerica, Mass. However, the adhesive could alternatively be any other suitable adhesive.

The light pipe 16 is also supported within the interface housing 24 by a locating ring 40 mounted in the internal passage 37. In the disclosed embodiment, the locating ring 40 is made of commercially-available aluminum alloy 6061-T6, but could alternatively be made of any other suitable material. The locating ring 40 has a cylindrical outer wall 41 with an end wall 45 defining a rectangular opening extending through the center thereof. The light pipe 16 extends through the opening such that two perpendicular sides of the light pipe are flush with two corresponding locating surfaces in the opening. An adhesive is disposed in the gaps between the other two sides of the light pipe 16 and the edges of the opening in the locating ring 40. In the disclosed embodiment, the adhesive is the above-mentioned ECCOBOND® epoxy adhesive, but could alternatively be any other suitable adhesive.

The outer wall 41 of the locating ring 40 further has an annular edge opposite to the end wall 45. The annular edge snugly engages an annular shoulder 39 defined by an annular recess 42 on the internal wall 35 of the interface housing 24. The annular recess 42 engages the outer wall 41 to center the locating ring 40 along the axis 22 while the annular edge engages the annular shoulder 39 such that the cylindrical end wall 45 of the locating ring is approximately flush with the input port 18 of the light pipe 16.

The interface housing 24 further includes structure to facilitate connection to other modules in the integrator assembly 10. For example, the interface housing 24 includes an annular coupling flange 43 disposed at the end of the interface housing that is proximate to the input port 18 of the light pipe 16. The annular coupling flange 43 first extends radially-outward from the exterior surface of the interface housing 24 in a manner perpendicular to the optical axis 22 of the light pipe 16 and then in a manner parallel to the optical axis, thus enlarging the diameter of the interface housing. The portion of the coupling flange 43 extending parallel to the optical axis 22 has an exterior surface and an interior surface. On the exterior surface, there is a threaded annular surface 44 that faces radially-outward and that extends approximately concentrically with respect to the optical axis 22. On the interior surface of the coupling flange 43, there is a locating cylindrical section 46 that faces radially-inward and that extends approximately concentrically with respect to the optical axis 22. Further, the coupling flange 43 includes a notch 48 cut out from the portion of the coupling sleeve extending parallel to the optical axis 22. The notch 48 is aligned with the center of the long wall of radiation guide 16 and configured to receive cooperating orientation structure on other modules in the integrator assembly 10.

Figure 4:
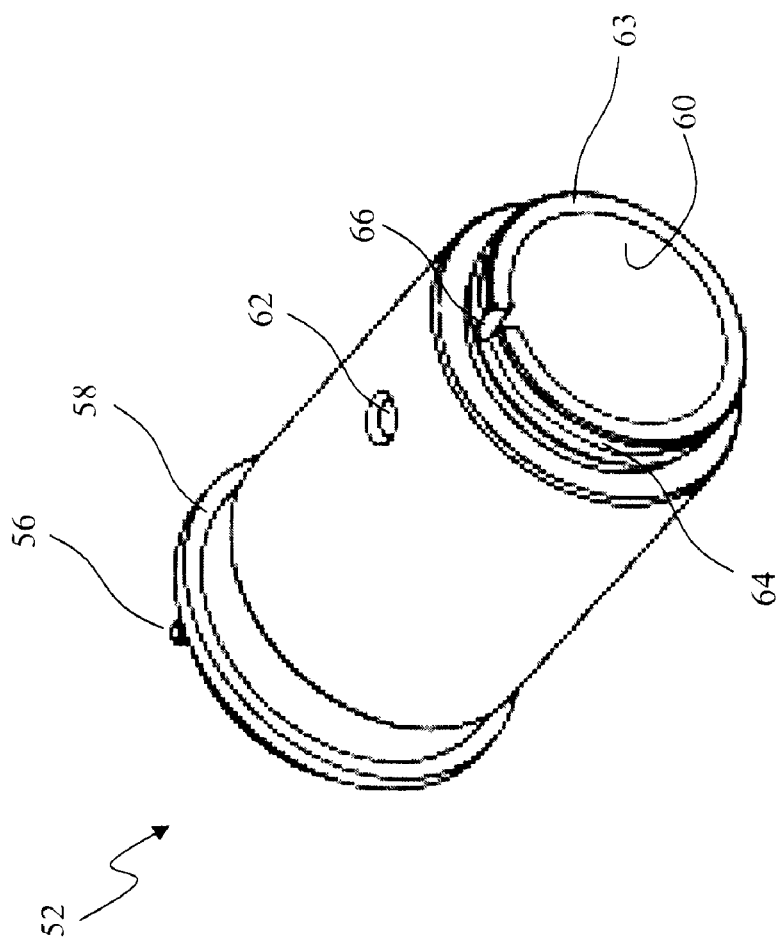
FIG. 4 is a diagrammatic perspective view of an extension housing or tube that is a further component of the assembly 10 of FIG. 1.

FIG. 4 is a diagrammatic perspective view of an extension housing or tube 52 that is a component of the assembly 10 of FIG. 1. In the disclosed embodiment, the extension tube 52 is made of commercially-available aluminum alloy 6061-T6, but could alternatively be made of any other suitable material.

With reference to FIGS. 1, 2, and 4, the extension tube 52 is coupled to the interface housing 24, as explained in more detail later. The extension tube includes a locating cylindrical section 54 that faces radially-outward with an outer diameter that substantially matches the inner diameter of the locating cylindrical section 46 on the interface housing 24. The cooperation of the two locating diameters 46 and 54 ensures that the extension tube is accurately positioned at a particular location in relation to the light pipe 16 in the interface housing 24. The extension tube 52 also includes an orientation pin 56 immediately adjacent to and extending perpendicularly away from the locating diameter 54. The notch 48 on the interface housing 24 receives the orientation pin 56. This cooperation between the notch 48 and the orientation pin 56 ensures that the extension tube 52 is positioned (or clocked) at a certain rotational angle about axis 22 of the light pipe 16 in the interface housing 24. The extension tube 52 also includes an annular retaining flange 58 extending from the extension tube 52 adjacent to and in a manner approximately parallel to the orientation pin 56. The retaining flange 58 facilitates the coupling between the interface housing 24 and the extension tube 52, as explained in more detail later. The extension tube 52 includes a further inner locating cylindrical section 60 facing radially-inward and extending longitudinally through the interior of the extension tube.

The extension tube 52 further includes structure to facilitate connection to other modules in the integrator assembly 10. For example, the extension tube 52 includes a hole 62 extending radially through the exterior of the extension tube to the locating cylindrical section 60. The hole 62 is configured to receive cooperating coupling structure. The extension tube 52 also includes an annular coupling lip 63 disposed on an opposite end of the extension tube from the retaining flange 56. The coupling lip 63 has a radially-inward facing surface that defines part of the locating cylindrical section 60 and a radially-outward facing annular surface that is of a smaller circumference than the exterior annular surface of the remainder of the extension tube 52. On the exterior surface of the coupling lip 63, there is a threaded annular surface 64 that faces radially-outward. The coupling lip 63 further includes a notch 66. The notch 66 is configured to receive cooperating orientation structure on other modules in the integrator assembly 10.

Figure 5:
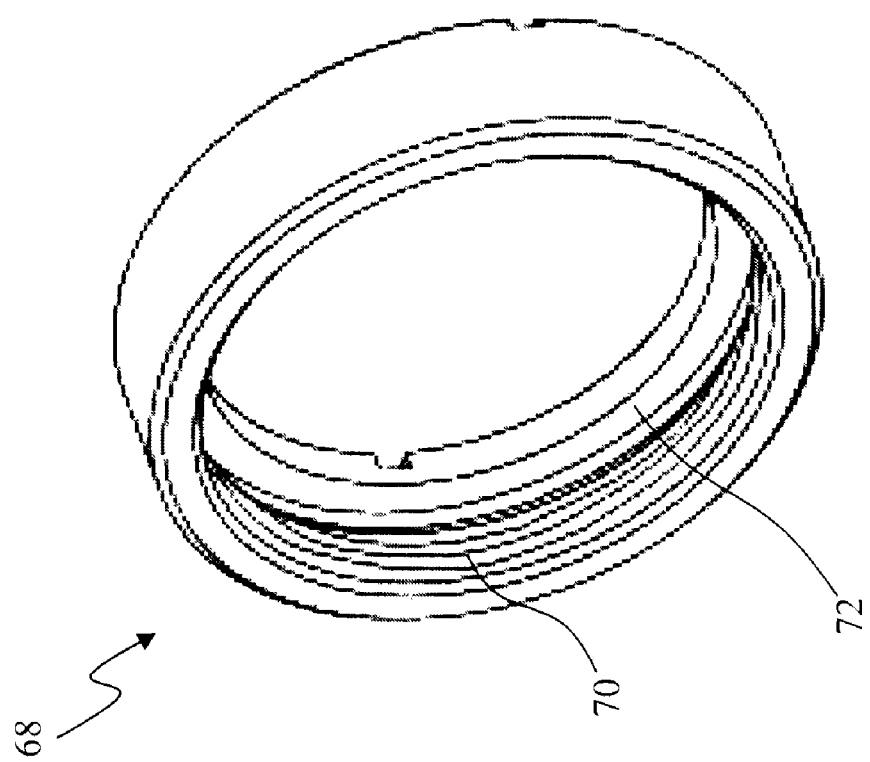
FIG. 5 is a diagrammatic perspective view of a retaining ring that is a further component of the assembly 10 of FIG. 1.

FIG. 5 is a diagrammatic perspective view of a retaining ring 68 that is a component of the assembly 10 of FIG. 1. In the disclosed embodiment, the retaining ring 68 is made of commercially-available aluminum alloy 6061-T6, but could alternatively be made of any other suitable material. The retaining ring 68 has a radially-inward facing threaded annular surface 70. The threads on the annular surface 70 are configured to cooperate with the threads on the threaded annular surface 44 on the interface housing 24. The retaining ring 68 also has a retaining surface 72 that extends radially-inward from and perpendicular to the threaded annular surface 70. The retaining surface has an aperture extending therethrough approximately equal in diameter to extension tube 52.

With reference to FIGS. 1, 2, and 5, the retaining ring 68 releasably couples the interface housing 24 to the extension tube 52 to prevent relative movement. In particular, the threaded annular surface 70 of the retaining ring 68 engages the threaded annular surface 44 on the interface housing 24. And the retaining surface 72 on the retaining ring 68 compressively engages the retaining flange 58 on the interface housing 24.

Figure 7:
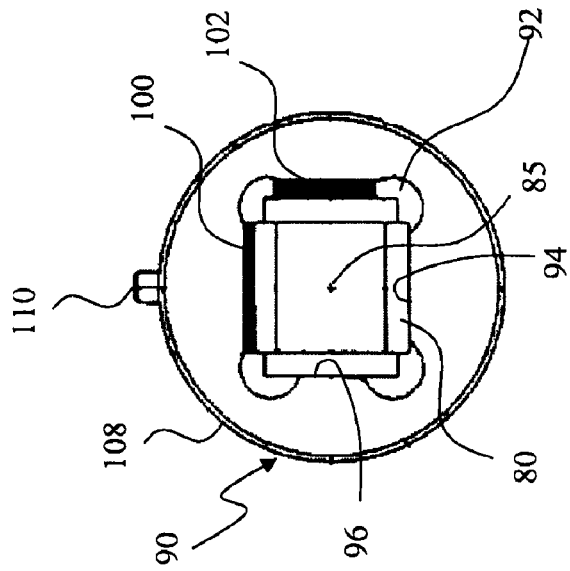
FIG. 7 is a diagrammatic end view of the light pipe in FIG. 6.
Figure 6:
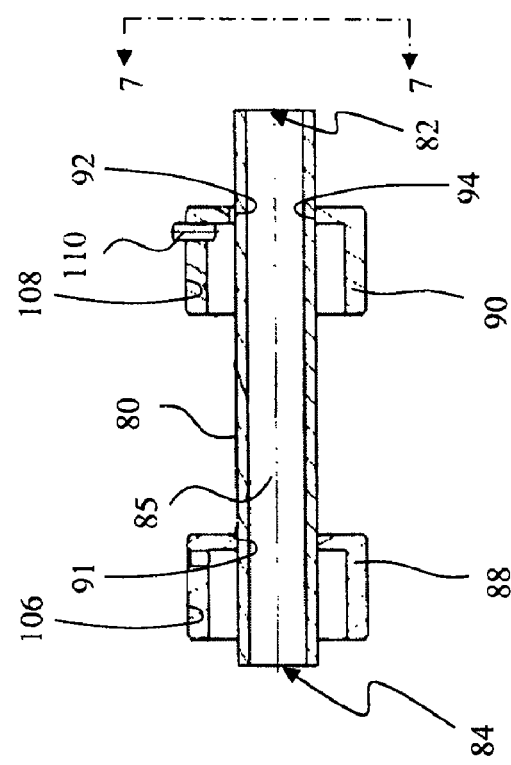
FIG. 6 is diagrammatic sectional side view of a radiation guide or light pipe taken along line 2-2 in FIG. 1.

FIG. 6 is a diagrammatic sectional side view of a radiation guide or light pipe 80 taken along line 2-2 in FIG. 1. For the sake of clarity, the light pipe 80 is shown in isolation from the other components of the radiation integrator assembly 10. FIG. 7 is a diagrammatic end view of the light pipe 80 taken along line 7-7 in FIG. 6.

With reference to FIGS. 2, 6, and 7, the light pipe 80 includes four interior walls defining a passage that has a rectangular cross-sectional shape. An input port 82 and an output port 84 are respectively disposed at either end of the passage. Light pipe 80 includes an optical axis 85 extending longitudinally through the passage. Both input port 82 and output port 84 have a rectangular cross-sectional shape and are equal in size. In other words, the passage in light pipe 80 has a cross-sectional size that remains constant along the optical axis 85 from the input port 82 to the output port 84.

In the disclosed embodiment, the walls of the passage in light pipe 80 are made of float glass. However, they could alternatively be made of any other suitable material. The inner side of each of these walls has a reflective coating of a known type that is not separately illustrated in the drawings, and that is highly reflective to all radiation within the visible spectrum. The various walls of float glass in the light pipe 80 are fixedly secured to each other by a suitable adhesive. In the disclosed embodiment, the adhesive is the above-mentioned NOA 61 optical adhesive, but could alternatively be any other suitable adhesive.

The light pipe 80 is disposed in the extension tube 52 and supported therein by a pair of locating rings 88 and 90. In the disclosed embodiment, the locating rings 88 and 90 are made of commercially-available aluminum alloy 6061-T6, but could alternatively be made of any other suitable material. The locating rings 88 and 90 have cylindrical end walls with rectangular openings 91 and 92 extending through the respective centers thereof. The light pipe 80 extends through the openings 91 and 92, which have a size larger than the portion of the light pipe disposed therein. The opening 92 in the locating ring 90 is defined on two sides by locating surfaces 94 and 96. Two locating surfaces of the light pipe 80 engage the respective locating surfaces 94 and 96, in order to accurately position the light pipe 80 within the locating ring 90. The opening 91 in locating ring 88 is also defined on two sides by locating surfaces similar to the locating surfaces 94 and 96. Two locating surfaces of the light pipe 80 similarly engage the locating surfaces in the locating ring 88, in order to accurately position the light pipe 80 within the locating ring 88. Because openings 91 and 92 are larger in size than the light pipe 80, when the light pipe is flush against the respective locating surfaces, gaps remain between bonding surfaces of the light pipe and bonding surfaces of the locating rings. An adhesive is disposed in these gaps to bond the locating rings 88 and 90 to the light pipe 80. Bond lines 100 and 102 between light pipe 80 and locating ring 90 are shown in FIG. 7. In the disclosed embodiment, the adhesive is the above-mentioned ECCO-BOND® epoxy adhesive, but could alternatively be any other suitable adhesive.

The locating rings 88 and 90 further includes annular rings that respectively extend from peripheral edges of the cylindrical end walls. On the exterior surfaces of the annular rings, locating rings 88 and 90 define locating diameters 106 and 108 that face radially-outward and extend approximately concentrically with respect to the optical axis 85 of light pipe 80. The locating diameters 106 and 108 are configured to engage the locating cylindrical section 60 in the extension tube 52, in order to accurately align the optical axis 85 of the light pipe 80 with the optical axis 22 of the light pipe 16. Locating ring 90 further includes an orientation pin 110 extending radially-outward from its annular ring. As shown in FIG. 7, orientation pin 110 bisects the long walls of rectangular light pipe 80. The notch 66 on the coupling lip 63 of the extension tube 52 receives the orientation pin 110. This cooperation between the notch 66 and the orientation pin 110 ensures that the locating ring 90 (and, hence, the light pipe 80) is rotationally positioned (or clocked) at a certain angle in relation to the light pipe 16 in the interface housing 24.

With reference to FIG. 2, the radiation integration assembly 10 includes a diffuser 111 disposed within the extension tube 52. Specifically, the diffuser 111 is sandwiched between the output port 84 of the light pipe 80 and the input port 18 of the light pipe 16. In the current embodiment, the diffuser 111 is a 10 degree diffuser available commercially under part number L10P1-12 from Luminit, LLC of Torrance, Calif. Alternatively, however, other diffusers may be used in assembly 10 or assembly 10 may lack a diffuser altogether.

Figure 8:
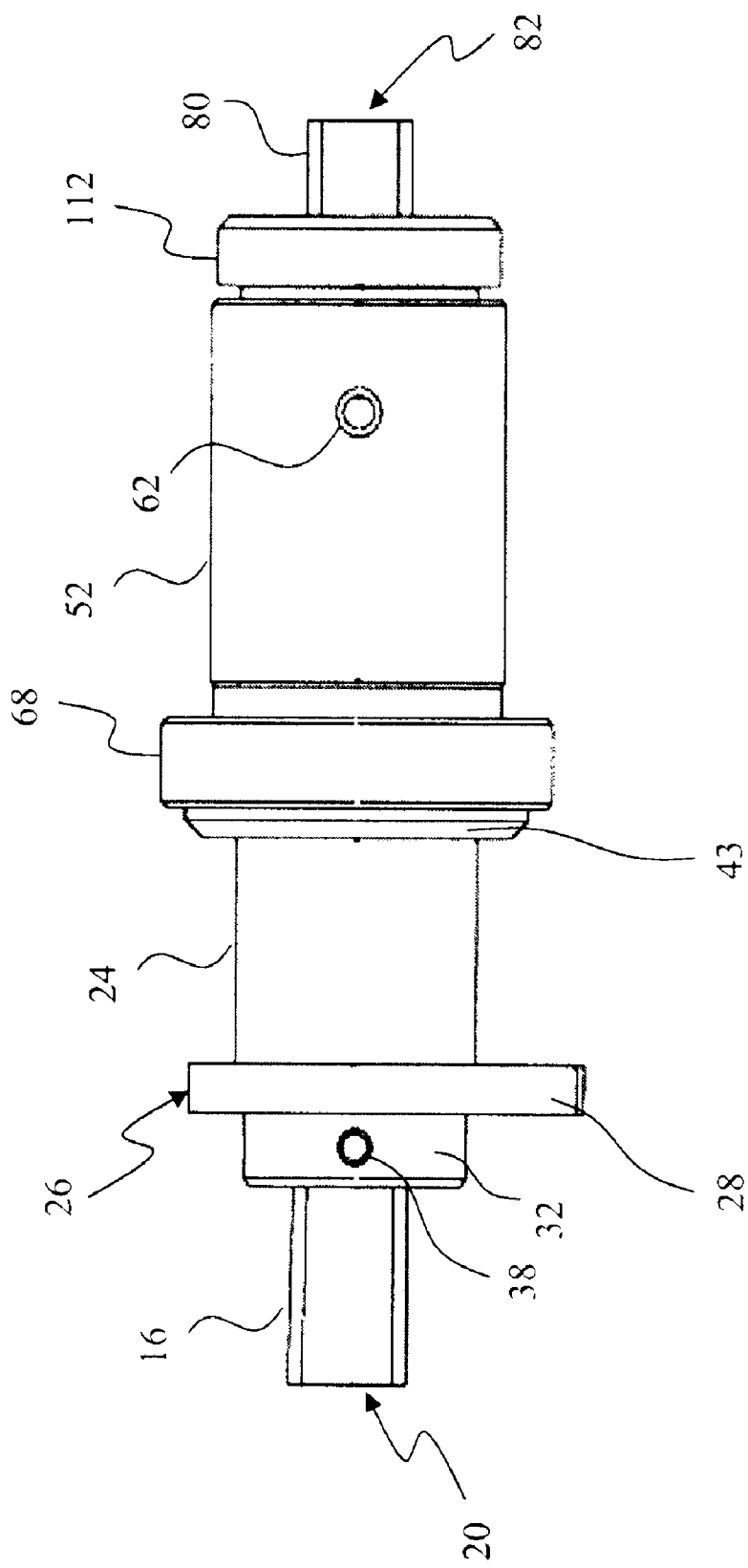
FIG. 8 is

FIG. 8 is a diagrammatic top view of a portion of the radiation integrator assembly 10. Specifically FIG. 8 shows the integrator housing 24 coupled to the extension tube 52, and the light pipe 80 disposed inside of the extension tube 52. With reference to FIGS. 2 and 8, the assembly 10 includes a retaining ring 112 that is similar to the previously described retaining ring 68. The retaining ring 112 includes a threaded annular surface similar to the threaded annular surface 70 and a retaining surface similar to the retaining surface 72, however, the retaining ring 112 is smaller in size than the retaining ring 68.

The retaining ring 112 releasably couples the locating ring 90 to the extension tube 52 to prevent relative movement. In particular, retaining ring 112 fits over the coupling lip 63 and the threaded annular surface of the retaining ring 112 engages the threaded annular surface 64 on the coupling lip 63. The retaining surface on the retaining ring 112 compressively engages the cylindrical end wall of the locating ring 90. When the retaining ring 112 is fully engaged with the extension tube 52 and locating ring 90, the input port 82 of the light pipe 80 extends through the retaining ring 112 and is disposed outside of the extension tube 52.

With reference to FIGS. 1 and 2, the radiation integrator assembly 10 includes an adjust tube 118. In the disclosed embodiment, the adjust tube 118 is made of commercially-available aluminum alloy 6061-T6, but could alternatively be made of any other suitable material. The adjust tube 118 has a circular end wall and a cylindrical body that extends from the peripheral edges of the end wall. The extension tube 52 is partially disposed within the adjust tube 118. The body of the adjust tubes has a cylindrical inner surface that slidably engages a cylindrical outer surface of the extension tube 52, in order to permit sliding movement of adjust tube 118 in relation to the extension tube 52. Further, the circular end wall of the adjust tube 118 has a aperture 120 disposed therethrough. The input port end of the light pipe 80 extends through the aperture 120. The circular end wall of the adjust tube 118 also includes two threaded openings 121 that extend into it, on diametrically opposite sides of the aperture 120.

The adjust tube 118 further includes a slot 122 that extends radially through the body of the adjust tube to the cylindrical inner surface. A screw 124 has a threaded shank that extends through the slot 122 and engages the threaded hole 62 in the extension tube 52. In the disclosed embodiment, the screw 124 is made of stainless steel, but it could alternatively be made of any other suitable material.

With reference to FIGS. 1 and 2, the radiation integrator assembly includes a light emitting diode (LED) module 126 that is releasably coupled to the adjust tube 118. The LED module 126 has a plate-like body with a not-illustrated optical window disposed on the side of the body adjacent to the adjust tube 118. The window is aligned with and positioned very near, but does not contact, the input port 82 of the light pipe 80. Two spaced cylindrical holes 128 are disposed on opposite sides of the window, and extend through the LED module body. In the disclosed embodiment, the LED module 126 is commercially available under the tradename PHLATLIGHT as part number CBM-290 from Luminus Devices, Inc. of Billerica, Mass., and is capable of simultaneously emitting light of different colors, specifically, red light, green light, and blue light. Alternatively, it may be possible to use other LED modules, including those capable of producing different color light.

A heat sink 131 is respectively supported on the LED modules 126. In the disclosed embodiment, the heat sink 131 is made of copper, but could alternatively be made of any other suitable material. The heat sink 131 serves to receive and dissipate heat emitted by the LED module. The heat sink 131 includes a heat-conducting plate 134 that has a bottom surface engaging the surface of the LED module 126 opposite of the adjust tube 118. To enhance heat transfer from the LED module 126 to the plate 134, a thermally-conducting material is provided between the LED module and the plate. In the disclosed embodiment, this material is a thermal joint compound available commercially under catalog number 120-2 from Wakefield Solutions, Inc. of Pelham, N.H. Alternatively, however, it would be possible to use any other suitable thermally-conductive material.

The heat sink 131 also includes a plurality of parallel and thermally-conductive spines 136 that are fixedly secured at their lower ends to and extend from the horizontal plate 134. Further, two screws 138 extend through spaced holes in the plate 134 of the heat sink 131, through the holes 128 in the LED module 126, and threadedly engage the openings 121 in the adjust tube 118. The screws 138 releasably secure the LED module 126 and the heat sink 131 to the adjust tube 118. In the disclosed embodiment, the screws 138 are each made of stainless steel, but they could alternatively be made of any other suitable material.

Figure 9:
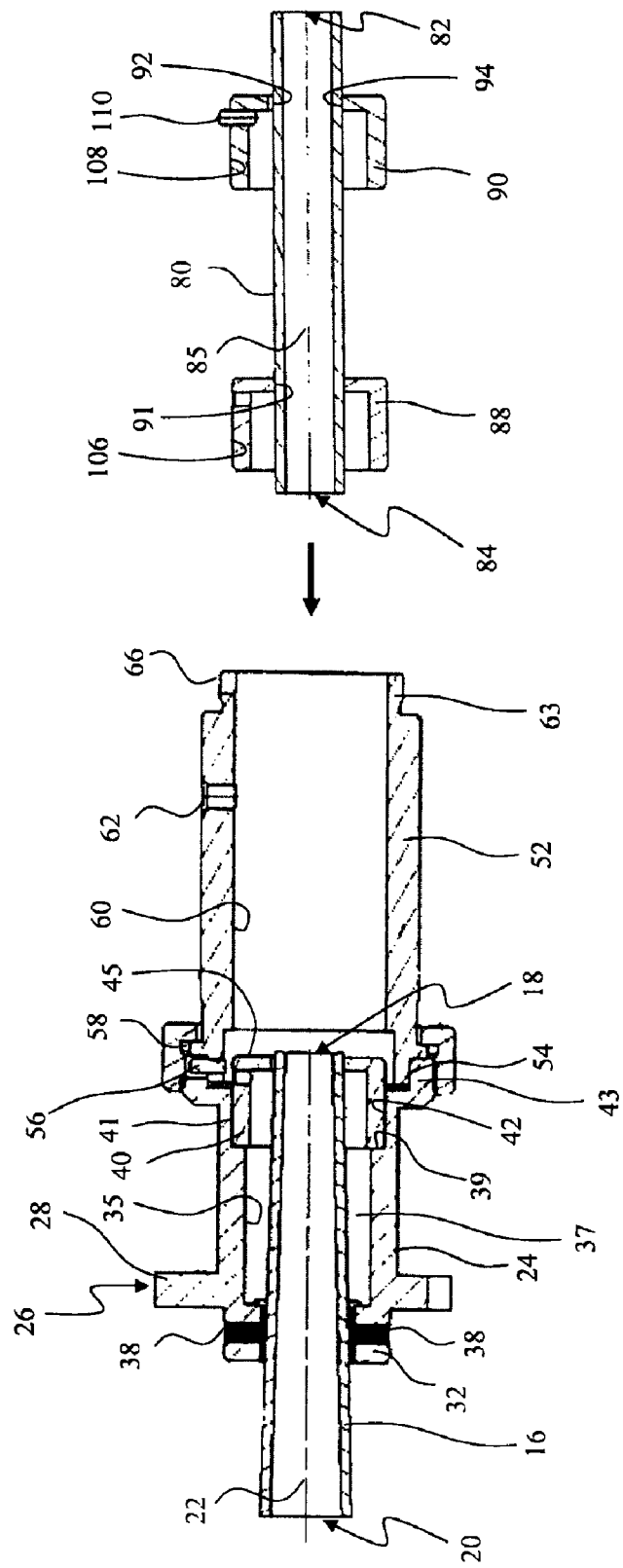
FIG. 9 is a diagrammatic sectional side view of the assembly 10 in a partially disassembled state taken along line 2-2 in FIG. 1.

FIG. 9 is a diagrammatic sectional side view of the assembly 10 in a partially disassembled state taken along line 2-2 in FIG. 1. With reference to FIGS. 1, 2 and 9, the assembly 10 may be assembled in the following manner. First, the light pipe 16 is inserted into the interface housing 24 through the rectangular aperture 36. A not-illustrated assembly jig is used to accurately position the light pipe 16 within the rectangular aperture 36. Next, the locating ring 40 is placed over the input port end of light pipe 16 and slid into interface housing 24 along annular recess 42 until it abuts the annular shoulder 39. As the locating ring 40 is slid over the light pipe 16, two perpendicular sides of the light pipe engage two locating surfaces in the opening in the locating ring 40 to orient the light pipe within the locating ring. When the locating ring 40 is fully inserted into the interface housing 24 such that it engages the annular shoulder 39, the end wall 45 of the locating ring should be flush with the input port 18 of the light pipe 16 and notch 48 should bisect the long walls of the light pipe 16. After the light pipe 16 has been properly positioned within interface housing 24, the light pipe is secured to the interface housing. Specifically, an adhesive is injected through the four injection ports 38 and into the gap between the light pipe 16 and surfaces of the aperture 36, and then is allowed to harden, in order to secure this portion of the light pipe against movement relative to the interface housing 24. Also, an adhesive is applied in the gap between the light pipe 16 and the edges of the opening in the locating ring 40. In the disclosed embodiment, the adhesive is the above-mentioned ECCOBOND® epoxy adhesive, but could alternatively be any other suitable adhesive.

Second, the extension tube 52 is releasably coupled to the interface housing 24. Specifically, the extension tube 52 is fitted within the coupling flange 43 of the interface housing 24 such the notch 48 receives the orientation pin 56 and the locating diameter of the cylindrical section 46 engages the locating diameter of the cylindrical section 54. Then, the retaining ring 68 is passed over the length of extension tube 52 and screwed onto the threaded annular surface 44 on the interface housing 24 such that the retaining surface 72 of the retaining ring compressively engages the retaining flange 58 of the extension tube 52. Before screwing on the retaining ring 68, a small amount of thread binding material (such as G-7526F Adhesive from Glyptal of Chelsea, Mass.) may be applied to either threaded surface to inhibit unwanted unthreading. Optionally, prior to securing the extension tube to the interface housing, the diffuser 111 may be placed flush with the input port 18 of the light pipe 16.

Third, the locating rings 88 and 90 are secured to the light pipe 80. Specifically, the light pipe 80 is inserted through the rectangular openings 91 and 92 in the locating rings 88 and 90 such that two perpendicular sides of the light pipe are flush against the locating surfaces 94 and 96 in the locating ring 90 and the corresponding locating surfaces in the locating ring 88. The center of orientation pin 110 is aligned to intersect axis 85 as shown in FIG. 7 such that the center of orientation pin 110 bisects the long walls of rectangular light pipe 80. An adhesive is applied in the gap between the locating rings 88 and 90 the light pipe 80 to bond them together. In the disclosed embodiment, the adhesive is the above-mentioned ECCOBOND® epoxy adhesive, but could alternatively be any other suitable adhesive.

Fourth, as shown in FIG. 9, the light pipe 80 is inserted into and releasably secured to the extension tube 52. As the light pipe 80 is inserted into the extension tube 52, the locating diameters 106 and 108 of the locating rings 88 and 90 slidely engage the locating cylindrical section 60 of the extension tube. The cooperation of the locating diameters aligns the optical axis 85 of the light pipe 80 with the optical axis 22 of the light pipe 16, and forms a system optical axis. Further, the light pipe 80 is rotationally positioned (or clocked) about the system optical axis inside the extension tube until the notch 66 on the coupling lip 63 receives the orientation pin 110 on the locating ring 90. The cooperation of the notch 66 and orientation pin 110 ensures that the light pipes are rotationally oriented about the system optical axis in the exact same manner. The retaining ring 112 is then screwed onto the threaded annular surface 70 of the extension tube 52 such that the retaining surface of the retaining ring compressively engages the locating ring 90. Again, a small amount of the above-mentioned thread binding material may be applied to either threaded surface before screwing on retaining ring 112.

Fifth, the adjust tube 118 is releasably secured over the extension tube 52. Specifically, the extension tube 52 is partially inserted into the adjust tube 118 such that the light pipe 80 passes through the aperture 120 in the adjust tube and the hole 62 in the extension tube is aligned with the slot 122 in the adjust tube. The screw 124 is then inserted into the slot and hole. When the screw 124 is not fully tightened, the adjust tube 118 can move longitudinally along the system optical axis with respect to extension tube 52. When the adjust tube 118 is in a suitable position with respect to the extension tube (for example, when the input port 82 is flush with the cylindrical end wall of the adjust tube 118) the screw 124 can be tightened to releasably secure the adjust tube against movement with respect to the extension tube 52.

Sixth, the LED module 126 and heat sink 131 are releasably secured to the adjust tube 118. Specifically, the openings 121 in the adjust tube 118, the holes 128 in the LED module 126, and the holes in the heat sink 131 are aligned and the screws 138 are inserted therethrough. The screws 138 may be tightened or loosened to position the optical window of the LED module 126 at a desired distance from the input port 82 of the light pipe 80.

In the assembled state of the radiation integrator assembly 10, and as shown in FIGS. 1 and 2, the window of the LED module 126 is disposed a small distance from the input port 82 of the light pipe 80. The LED module 126 emits red, green, and blue light into the input port 82 and along the system optical axis of the assembly 10. As the multiple colors of light propagate through the light pipes 80 and 16 along the system optical axis, they homogenize (or integrate). Thus, when the light exits the assembly 10, the multiple colors are uniformly distributed across the output port 20.

The radiation integrator assembly is not limited to the aspects described in the current embodiment. For example, although integrator assembly is depicted with two light pipes, one tapered and one straight, light pipes with different structural characteristics may augment or replace the depicted light pipes. Further, the interface housing, extension tube, and locating ring may be releasably coupled by means other than retaining rings. Additionally, the assembly process described above may be modified in any number of ways to conform to established fabrication practices. Thus, the modular design of radiation integrator assembly allows light pipes of varying lengths and shapes to be combined along a common axis in a compact and cost effective manner.

The foregoing outlines features of a selected embodiment so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiment introduce herein. Those skilled in the art should also realize that such equivalent constructions do not depart from the spirit and scope of the present disclosure, and that they may make various changes, substitutions, and alterations herein without departing from the spirit and scope of the present disclosure, as defined by the claims that follow.

What is claimed is:

1. A modular radiation integrator assembly comprising:
    a first radiation guide defining a first passage extending between a first input port and a first output port;
    a first housing having the first radiation guide supported therein;
    a second radiation guide defining a second passage extending between a second input port and a second output port; and
    a second housing having the second radiation guide supported therein such that the second passage defines an output path of travel;
    wherein the first housing is couplable to the second housing such that the first output port is in communication with the second input port.

2. A modular radiation integrator assembly according to claim 1, wherein the second housing is releasably secured to the first housing to prevent relative movement.

3. A modular radiation integrator assembly according to claim 2,
    wherein at least one of the first housing and second housing includes a threaded first annular surface that faces radially outward; and
    including a retaining ring with a threaded second annular surface facing radially inward for engaging the first annular surface to releasably secure the first housing to the second housing.

4. A modular radiation integrator assembly according to claim 1,
    wherein the first radiation guide includes an optical axis defined by the first passage; and
    wherein the first housing and second housing include cooperating orientation structure to orient the second housing about the optical axis.

5. A modular radiation integrator assembly according to claim 4, wherein the cooperating orientation structure includes the first housing having an orientation pin extending approximately perpendicular to the optical axis, and includes the second housing having a notch that receives the orientation pin when the second housing and first housing are coupled.

6. A modular radiation integrator assembly according to claim 1,
    wherein the first radiation guide includes an first optical axis defined by the first passage and the second radiation guide includes a second optical axis defined by the second passage; and
    wherein the first housing and second housing include cooperating locating structure to align the first and second optical axes.

7. A modular radiation integrator assembly according to claim 6,
    including a plurality of locating members releasably securing the first radiation guide within the first housing, each of the plurality of locating members having an outer surface, the outer surfaces collectively defining a third locating diameter; and
    wherein the first housing includes a fourth locating diameter slidely engaging the third locating diameter.

8. A modular radiation integrator assembly according to claim 7, wherein each of the plurality of locating members includes a locating surface partially defining an aperture, the first radiation guide passing therethrough and engaging the locating surface.

9. A modular radiation integrator assembly according to claim 7,
    wherein the first housing includes a threaded first annular surface that faces radially outward; and
    including a retaining ring with a threaded second annular surface facing radially inward, the retaining ring engaging the first annular surface and one of the plurality of locating members to releasably secure the first radiation guide within the first housing.

10. A modular radiation integrator assembly according to claim 7,
    wherein one of the plurality of locating members includes an orientation pin extending approximately perpendicular to the first optical axis; and
    wherein the first housing includes a notch that receives the orientation pin when the first radiation guide is releasably secured within the first housing.

11. A modular radiation integrator assembly according to claim 1, wherein second output port and the second input port differ in size.

12. A modular radiation integrator assembly according to claim 11, wherein the first output port and first input port are substantially equal in size.

13. A modular radiation integrator assembly according to claim 1,
    wherein the first radiation guide includes a cross-section that is substantially uniform along a length of the first radiation guide; and
    wherein the second radiation guide includes a cross-section that varies along a length of the second radiation guide.

14. A modular radiation integrator assembly according to claim 1,
    including a radiation source releasably secured to the first housing such that radiation emitted by the radiation source enters the first input port of the first radiation guide; and
    wherein the radiation includes a plurality of wavebands, each waveband corresponding to a different color of light.

15. A modular radiation integrator assembly comprising:
    a radiation source that emits radiation;
    a first integrator module including a first input port and a first output port;
    an adjust tube configured to partially receive the first integrator module and engage the radiation source in a manner such that the radiation emitted by the radiation source travels to and enters the first input port; and
    a second integrator module including a second input port and second output port, the second integrator module couplable to the first integrator module outside the adjust tube in a manner such that the radiation exits the first output port and enters the second input port.

16. A modular radiation integrator assembly according to claim 15,
wherein the first integrator module is releasably coupled to the second integrator module; and
wherein the first and second integrator modules include cooperating orientation structure configured to orient the first and second integrator modules about an axis.

17. A modular radiation integrator assembly according to claim 15, wherein the adjust tube is releasably secured to the first integrator module to prevent relative movement.

18. A modular radiation integrator assembly according to claim 17, wherein the adjust tube and first integrator module include cooperating support structure configured so that the first integrator module is positionally adjustable towards and away from the radiation source.

19. A modular radiation integrator assembly according to claim 15, wherein the radiation includes a plurality of wavebands, each waveband corresponding to a different color of light.

20. A modular radiation integrator assembly according to claim 15,
including a heat sink; and
wherein the radiation source is releasably secured between the adjust tube and the heat sink.

21. A modular radiation integrator assembly according to claim 20, wherein the adjust tube, radiation source, and heat sink include cooperating support structure configured so that the radiation source is positionally adjustable towards and away from the adjust tube.

22. A modular radiation integrator assembly according to claim 15, wherein second output port and the second input port differ in size.

23. A modular radiation integrator assembly according to claim 22, wherein the first output port and first input port are substantially equal in size.

24. A modular radiation integrator assembly according to claim 15,
wherein the first integrator module includes a first radiation guide with a cross-section that is substantially uniform along a length of the first radiation guide; and
wherein the second integrator module includes a second radiation guide with a cross-section that varies along a length of the second radiation guide.

25. A method of assembling a modular radiation integrator comprising the steps of:
providing a radiation source that emits radiation;
providing an adjust tube having a cavity therein;
providing a first integrator module including a first input port and a first output port;
providing a second integrator module including a second input port and second output port;
releasably securing the second integrator module to the first integrator module such that the first output port is aligned with the second input port;
releasably securing the first integrator module partially inside the cavity of the adjust tube, such that the radiation enters the first input port; and
releasably securing the radiation source to the adjust tube.

26. A method of assembling a modular radiation integrator according to claim 25, wherein the releasably securing the first integrator module partially inside the cavity of the adjust tube includes orienting the first integrator module about an axis.

27. A method of assembling a modular radiation integrator according to claim 25, wherein the releasably securing the second integrator module to the first integrator module includes orienting the second integrator module about an axis.

28. A method of assembling a modular radiation integrator according to claim 25,
wherein the providing the first integrator module includes providing a first housing and a first radiation guide, the first radiation guide defining a first passage between the first input port and the first output port;
wherein providing the second integrator module includes proving a second housing and a second radiation guide, the second radiation guide defining a second passage between the second input port and the second output port; and
wherein the releasably securing the second integrator module to the first integrator module includes orienting the first and second passages along an axis such that the first output port and the second input port are in communication.

29. A method of assembling a modular radiation integrator according to claim 28,
including providing a plurality of locating members supporting the first radiation guide within the first housing, each of the plurality of locating members having an aperture with the first radiation guide passing therethrough;
wherein the first housing includes a cavity extending therethrough and sized to receive the plurality of locating members; and
including releasably securing one of the plurality of locating members to the first housing prior to the releasably securing the first integrator module partially inside the cavity of the adjust tube.

30. A method of assembling a modular radiation integrator according to claim 29, wherein the releasably securing one of the plurality of locating members to the first housing includes orienting the one of the plurality of locating members about the axis.

31. A method of assembling a modular radiation integrator according to claim 25, including releasably securing a heat sink to the radiation source on a side thereof opposite from the adjust tube.

* * * * *